(12) United States Patent
Mookan

(10) Patent No.: US 10,096,220 B2
(45) Date of Patent: Oct. 9, 2018

(54) SYSTEMS AND METHODS FOR INTEGRATING A GUEST MODE IN A SECURITY CONTROL PANEL DEVICE

(71) Applicant: Honeywell International Inc., Morristown, NJ (US)

(72) Inventor: Arumugakumar Mookan, Madurai (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/252,751

(22) Filed: Aug. 31, 2016

(65) Prior Publication Data

US 2018/0061202 A1     Mar. 1, 2018

(51) Int. Cl.
| | |
|---|---|
| *G08B 1/00* | (2006.01) |
| *G08B 13/24* | (2006.01) |
| *G08B 25/00* | (2006.01) |
| *H04L 29/08* | (2006.01) |
| *H04M 1/725* | (2006.01) |

(52) U.S. Cl.
CPC ....... *G08B 13/2491* (2013.01); *G08B 25/008* (2013.01); *H04L 67/24* (2013.01); *H04M 1/72527* (2013.01)

(58) Field of Classification Search
None
See application file for complete search history.

(56) References Cited

U.S. PATENT DOCUMENTS

| | | | |
|---|---|---|---|
| 5,742,904 A | 4/1998 | Pinder et al. | |
| 9,000,884 B2* | 4/2015 | Son ..................... | H04L 41/0883 340/3.1 |
| 2004/0189471 A1 | 9/2004 | Ciarcia, Jr. et al. | |
| 2010/0185470 A1 | 7/2010 | Sagar | |
| 2014/0002236 A1 | 1/2014 | Pineau et al. | |
| 2014/0266573 A1 | 9/2014 | Sullivan | |
| 2015/0130614 A1 | 5/2015 | Liu | |
| 2015/0156031 A1* | 6/2015 | Fadell ................. | H04L 12/2816 700/276 |
| 2015/0167995 A1* | 6/2015 | Fadell .................... | F24F 11/006 700/275 |
| 2015/0309483 A1 | 10/2015 | Lyman et al. | |
| 2015/0309487 A1 | 10/2015 | Lyman | |
| 2017/0132909 A1* | 5/2017 | Rabb ...................... | G08B 29/18 |

OTHER PUBLICATIONS

Tado thermostat review—smart thermostat remote control via mobile app—http://www.pcadvisor.co.uk/review/smart-thermostats/tado-thermostat-review-3509567/ [Apr. 29, 2016].
Extended European search report for corresponding EP patent application 17180585.6, dated Jan. 19, 2018.

\* cited by examiner

*Primary Examiner* — Julie Lieu
(74) *Attorney, Agent, or Firm* — Husch Blackwell LLP

(57) ABSTRACT

Systems and methods for integrating a GUEST mode in a security control panel device are provided. Some methods can include enabling a GUEST mode of a security system in a monitored region, and when in the GUEST mode, providing one or more guest users with control of at least one automation device in the security system, or executing one or more fallback scenes that account for a presence of the one or more guest users in the monitored region.

18 Claims, 3 Drawing Sheets

SYSTEMS AND METHODS FOR INTEGRATING A GUEST MODE IN A SECURITY CONTROL PANEL DEVICE

FIELD

The present invention relates generally to security systems and security control panel devices that are part of a security system. More particularly, the present invention relates to systems and methods for integrating a GUEST mode in a security control panel device.

BACKGROUND

Security control panel devices in a security system are known in the art and can provide both security to and automation of a residence to a homeowner user. Known security control panel devices can support modes such as ARM and DISARM in which the user can secure or unsecure the home. Known security control panel devices can also execute one or more scenes, for example, by activating a plurality of automation devices in the home, based on a predetermined schedule and the mode of the security control panel device.

It is common for a homeowner user to have guests in his home, and known security control panel devices can support guest users by configuring a guest user code. For example, FIG. 1 is a flow diagram of a method 100 of a security control panel device supporting a guest user as is known in the art. As seen in FIG. 1, a guest user can enter a user code into the control panel device as in 110 and enter an ARM or DISARM command into the control panel device as in 120. The method 100 can determine whether the entered user code is valid as in 130, and, if so, can place the security control panel device into the mode entered in 120 as in 140.

However, known security control panel devices do not provide guest users with control of automation devices in the home. Therefore, a guest may not be aware of the automation devices or how to control the automation devices in different areas of the home, such as in the kitchen or in the bathroom. For example, the guest may not have access to a mobile application that facilitates the control of automation devices in the home, even for a limited duration of time that is authorized by a homeowner user. Furthermore, when a guest is present in a home, known security control panel devices fail to account for the presence of the guest. Accordingly, the security control panel device may execute a scene at a predetermined time, such as turning off all lights in the home at the predetermined time, which may unintentionally affect the guest in the home.

In view of the above, there is a continuing, ongoing need for improved systems and methods.

DETAILED DESCRIPTION

Figure 1:
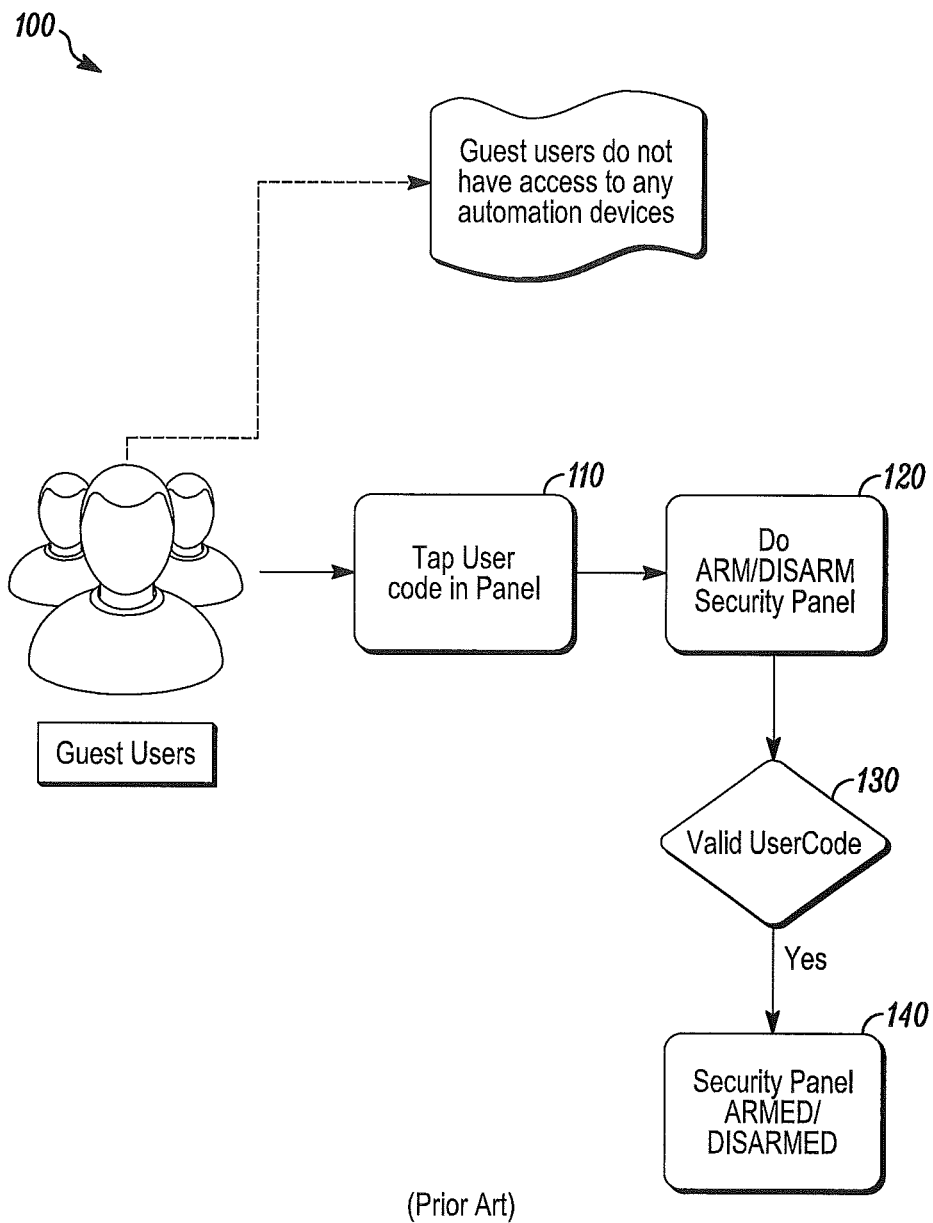
FIG. 1 is a flow diagram of a method of a security control panel device supporting a guest user as is known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for integrating a GUEST mode in a security control panel device. For example, in some embodiments, a security control panel device can support a GUEST mode, and a homeowner, master user can enable or disable the GUEST mode via the security control panel device or another user interface, such as a web interface, as would be known by those of skill in the art. In some embodiments, the security control panel device can receive input from the master user to specify a period or duration of time during which the GUEST mode will be active.

In some embodiments, the GUEST mode can co-exist with ARM or DISARM modes of the security control panel device. Alternatively, in some embodiments, the GUEST mode can be a standalone mode.

In some embodiments, the security control panel device can receive input from a master user to configure a guest user having access or control—limited, restricted, or otherwise—to one or more automation devices in the home. For example, a guest user can register and authenticate his mobile device, and information associated therewith, with the security control panel device via, for example, a WiFi signal, and, after such registration and authentication, the guest user can control one or more of the automation devices configured for guest access via his mobile device.

As is known in the art, a security control panel device can execute one or more scenes in an associated home based on a predetermined schedule. In some embodiments disclosed herein, when the security control panel device is in the GUEST mode, the security control panel device can execute a fallback scene instead of a primary scene at a predetermined time at which the control panel device would otherwise execute the primary scene. In some embodiments, the primary scene can include actions that do not account for the presence of a guest user in the home, while the fallback scene can include actions that do not affect a guest user or his privacy in the home. For example, in some embodiments, a fallback scene as disclosed herein can exclude activation of one or more automation devices in the home that are configured for guest access. Alternatively, in some embodiments, a fallback scene as disclosed herein can exclude activation of all automations devices in the home.

In some embodiments, when the security control panel device is in the GUEST mode, the security control panel device can receive input from a guest user for dynamically creating or executing one or more scenes. In some embodiments, the security control panel device can respond to guest user input for dynamically creating or executing one or more scenes only after a guest user registers and authenticates his mobile device with the security control panel device.

In some embodiments, after a guest user registers and authenticates his mobile device with the security control panel device via, the security control panel device can monitor and track the activities and location of the guest user's mobile device. Furthermore, in some embodiments, when the security control panel device detects the guest user's mobile device within the home, the security control panel device can automatically enter the GUEST mode.

Figure 2:
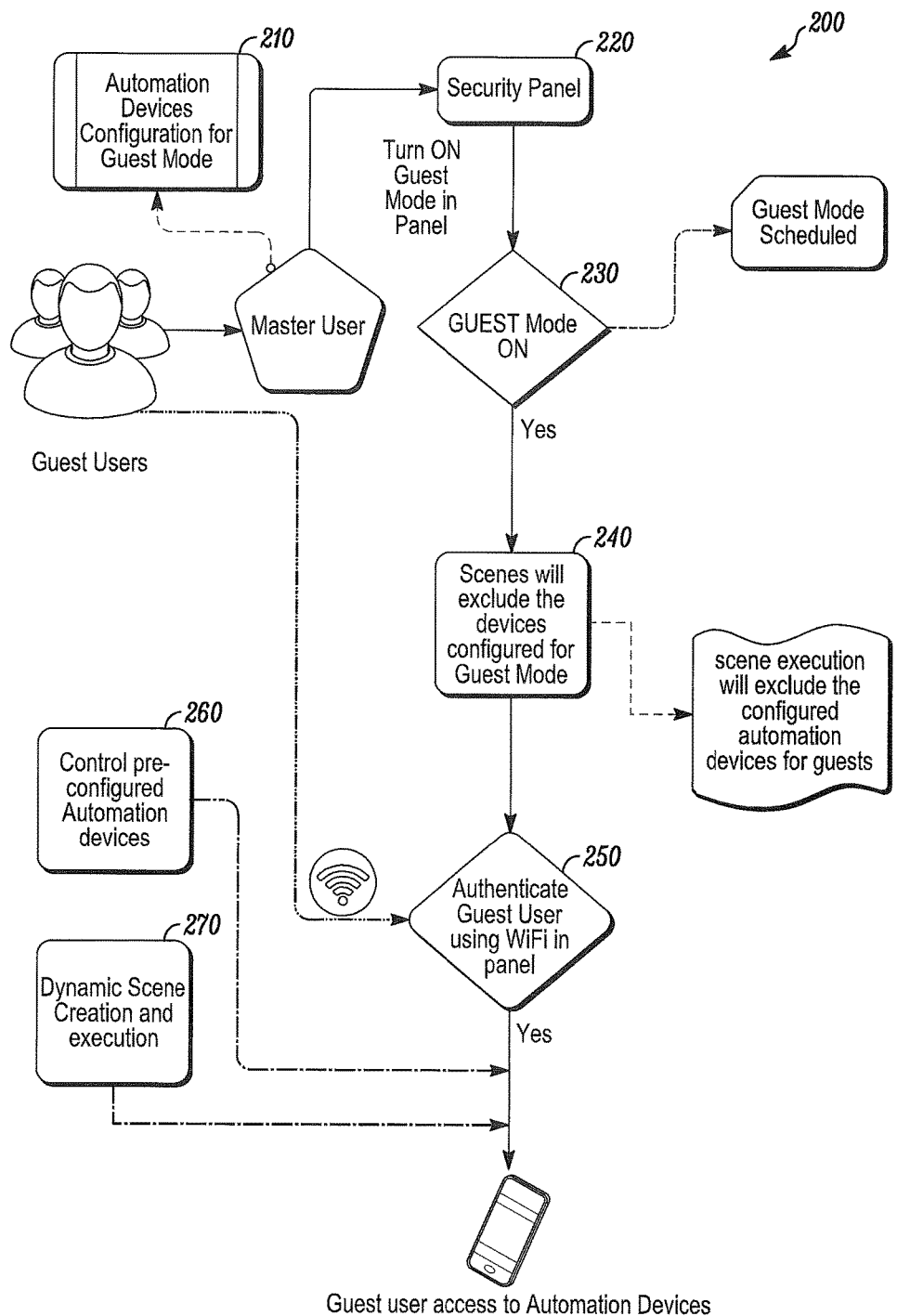
FIG. 2 is a flow diagram of a method of integrating a GUEST mode in a security control panel device in accordance with disclosed embodiments.

FIG. 2 is a flow diagram of a method 200 of integrating a GUEST mode in a security control panel device in accordance with disclosed embodiments. As seen in FIG. 2, a master user can provide input for configuring one or more automation devices in a home for a GUEST mode or for guest access as in 210. For example, in some embodiments, the master user can provide the input for configuring the automation devices for the GUEST mode or for the guest access to a security control panel device, and in some embodiments, the master user can provide the input for configuring the automation devices for the GUEST mode or for the guest access to the automation devices directly.

As also seen in FIG. 2, the master user can provide input for enabling the GUEST mode in a security control panel device as in 220. For example, in some embodiments, the master user can provide the input for enabling the GUEST mode in the security control panel device to the security control panel device itself. The method 200 can also determine whether the GUEST mode is enabled as in 230. For example, the method 200 can reference a schedule identifying times during which the GUEST mode should be enabled.

When the method 200 determines that the GUEST mode is enabled as in 230, the method 200 can execute one or more fallback scenes as in 240. In some embodiments, an executed fallback scene can exclude automation devices that have been configured for the GUEST mode or for the guest access in 210 from being activated.

A guest user can register and authenticate his mobile device with a security control panel device, and, as seen in FIG. 2, the method 200 can include determining whether a guest user's mobile device has been authenticated as in 250. If so, then the method 200 can include the security control panel device controlling any automation devices that have been configured for the GUEST mode or for the guest access in 210 pursuant to user input received from the guest user or his mobile device as in 260. Additionally or alternative, if the method 200 determines that a guest user's mobile device has been authenticated as in 250, then the method 200 can include the security control panel device executing one or more fallback scenes according to a predetermined schedule or dynamically creating and executing one or more scenes pursuant to user input received from the guest user or his mobile device as in 270.

Figure 3:
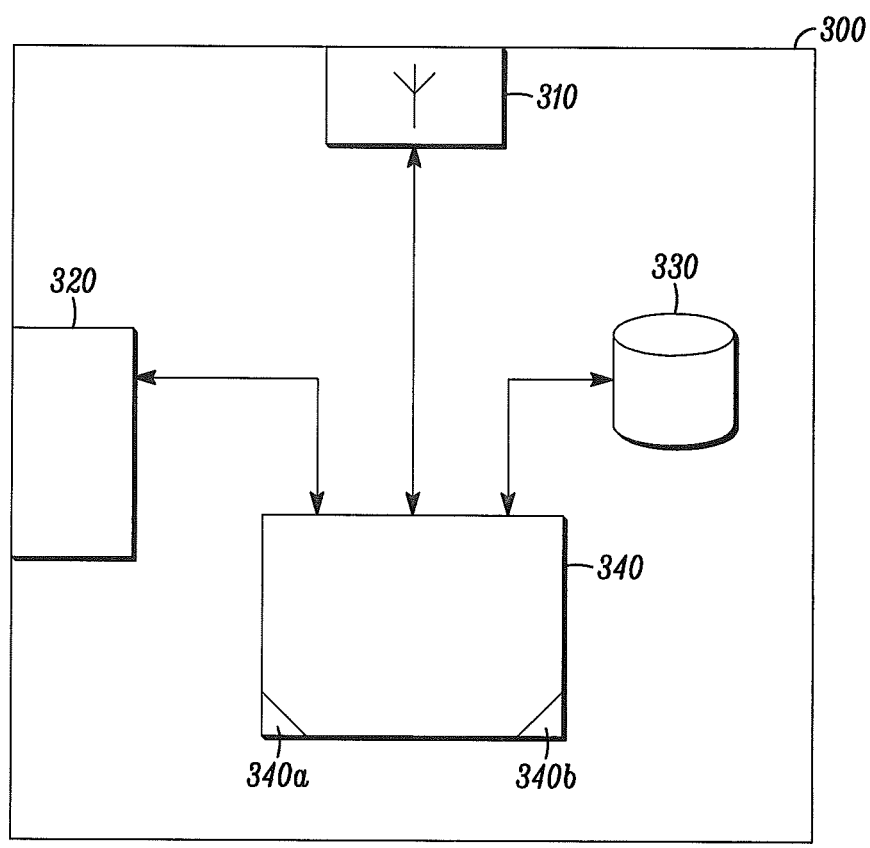
FIG. 3 is a block diagram of a security control panel device in accordance with disclosed embodiments.

FIG. 3 is a block diagram of a security control panel device 300 in accordance with disclosed embodiments. As seen in FIG. 3, the system 300 can include a transceiver device 310, a user interface device 320, and a memory device 330, each of which can be in communication with control circuitry 340, one or more programmable processors 340a, and executable control software 340b as would be understood by one of ordinary skill in the art. The executable control software 340b can be stored on a transitory or non-transitory computer readable medium, including, but not limited to, local computer memory, RAM, optical storage media, magnetic storage media, flash memory, and the like.

In some embodiments, the device 300 can communicate, via a wired or wireless connection, with one or more security devices, automation devices, or mobile devices in an associated monitored region or with a remote monitoring station, via the transceiver device 310. Furthermore, in some embodiments, the device 300 can receive user input from one or more of a master user and a guest user via the user interface device 320. In some embodiments, the memory device 330 can store one or more pieces of data that can be accessed and used by the control circuitry 340, programmable processor 340a, and control software 340b, including, but not limited to, a list of automation devices that have been configures for a guest user, a list of mobile devices that have been registered and authenticated as being associated with a guest user, a list of actions to be executed in primary and fallback scenes, and a list of predetermined times at which to execute primary and fallback scenes.

In some embodiments, some or all of the control circuitry 340, programmable processor 340a, and control software 340b can execute and control at least some of the methods described above and herein. For example, in some embodiments, some or all of the control circuitry 340, programmable processor 340a, and control software 340b can enable or disable a GUEST mode of the device 300, can approve or facilitate a guest user accessing or controlling an automation device that has been configured for a guest user, can register and authenticate a guest user's mobile device, can monitor and track the activities and location of a guest user's mobile device, can cause execution of a fallback scene in lieu of a primary scene at a predetermined time, can identify actions for execution in or for omission from a fallback scene, can identify automation devices to be excluded from activation in a fallback scene, or can create or execute a guest user scene. In some embodiments, the control circuitry 340, programmable processor 340a, and control software 340b can perform some or all of the above-identified actions responsive to user input received via the user interface device 320 or via user input received via the transceiver device 310 communicating with one or more other devices.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   enabling a GUEST mode of a security system in a monitored region; and
   when in the GUEST mode, providing one or more guest users with control of at least one of a plurality of automation devices in the security system and executing one or more fallback scenes that account for a presence of the one or more guest users in the monitored region,
   wherein the one or more fallback scenes include some of the plurality of automation devices performing actions that fail to affect the one or more guest users, and
   wherein the some of the plurality of devices that perform the actions that fail to affect the one or more guest users are exclusive of the at least one of the plurality of automation devices to which the one or more guest users is provided with the control.

2. The method of claim 1 further comprising enabling the GUEST mode responsive to received user input.

3. The method of claim 1 further comprising:
   receiving user input specifying a period or duration of time during which the GUEST mode will be active; and
   enabling the GUEST mode for the period or duration of time.

4. The method of claim 1 further comprising enabling the GUEST mode while the security system is in an ARM mode or is in a DISARM mode.

5. The method of claim 1 further comprising enabling the GUEST mode in lieu of enabling an ARM mode or a DISARM mode of the security system.

6. The method of claim 1 further comprising registering and authenticating a mobile device of the one or more guest users.

7. The method of claim 6 further comprising enabling the GUEST mode responsive to detecting registration and authentication of the mobile device in the monitored region.

8. The method of claim 6 further comprising providing the one or more guest users with the control after registering and authenticating the mobile device.

9. The method of claim 1 further comprising executing the one or more fallback scenes at a predetermined time at which a primary scene that fails to account for the presence of the one or more guest users in the monitored region would be executed outside of the GUEST mode.

10. A system comprising:
a transceiver device;
a memory device;
a programmable processor; and
executable control software stored on a non-transitory computer readable medium,
wherein the programmable processor and the executable control software enable a GUEST mode of a security system in a monitored region,
wherein, when in the GUEST mode, the programmable processor and the executable control software provide one or more guest users with control of at least one of a plurality of automation devices that is in communication with the transceiver device or an identification of which is stored in the memory device and execute one or more fallback scenes that account for a presence of the one or more guest users in the monitored region,
wherein the one or more fallback scenes include some of plurality of automation devices performing actions that fail to affect the one or more guest users, and
wherein the some of the plurality of devices that perform the actions that fail to affect the one or more guest users are exclusive of the at least one of the plurality of automation devices to which the one or more guest users is provided with the control.

11. The system of claim 10 further comprising:
a user interface device,
wherein the programmable processor and the executable control software enable the GUEST mode responsive to user input received by the user interface device.

12. The system of claim 10 further comprising:
a user interface device,
wherein the programmable processor and the executable control software specify a period or duration of time during which the GUEST mode will be active responsive to user input received by the user interface device, and
wherein the programmable processor and the executable control software enable the GUEST mode for the period or duration of time.

13. The system of claim 10 wherein the programmable processor and the executable control software enable the GUEST mode while the security system is in an ARM mode or is in a DISARM mode.

14. The system of claim 10 wherein the programmable processor and the executable control software enable the GUEST mode in lieu of enabling an ARM mode or a DISARM mode of the security system.

15. The system of claim 10 wherein the programmable processor and the executable control software register and authenticate a mobile device of the one or more guest users.

16. The system of claim 15 wherein the transceiver device receives a signal from the mobile device indicative of the mobile device being in the monitored region, and wherein, responsive to the transceiver device receiving the signal, the programmable processor and the executable control software enable the GUEST mode.

17. The system of claim 15 wherein the programmable processor and the executable control software provide the one or more guest users with the control after registering and authenticating the mobile device.

18. The system of claim 10 wherein the programmable processor and the executable control software execute the one or more fallback scenes at a predetermined time at which a primary scene that fails to account for the presence of the one or more guest users in the monitored region would be executed outside of the GUEST mode.

* * * * *